US009409579B2

(12) United States Patent
Eichin et al.

(10) Patent No.: US 9,409,579 B2
(45) Date of Patent: Aug. 9, 2016

(54) METHOD FOR MONITORING A DOOR CONTACT SWITCH OF A DRIVER'S DOOR OF A MOTOR VEHICLE

(71) Applicant: Dr. Ing. h.c. F. Porsche Aktiengesellschaft, Stuttgart (DE)

(72) Inventors: Matthias Eichin, Flein (DE); Thomas Ohl, Friolzheim (DE); Bastian Luther, Stuttgart (DE)

(73) Assignee: DR. ING. H.C. F. PORSCHE AKTIENGESELLSCHAFT, Stuttgart (DE)

( * ) Notice: Subject to any disclaimer, the term of this patent is extended or adjusted under 35 U.S.C. 154(b) by 0 days.

(21) Appl. No.: 14/606,047

(22) Filed: Jan. 27, 2015

(65) Prior Publication Data

US 2015/0210289 A1   Jul. 30, 2015

(30) Foreign Application Priority Data

Jan. 28, 2014   (DE) .......................... 10 2014 100 927

(51) Int. Cl.
*B60W 50/00* (2006.01)
*B60W 50/02* (2012.01)
*B60W 50/12* (2012.01)
*B60K 28/12* (2006.01)
*H01H 13/18* (2006.01)
*E05F 15/42* (2015.01)

(52) U.S. Cl.
CPC ............ *B60W 50/0205* (2013.01); *B60K 28/12* (2013.01); *B60W 50/12* (2013.01); *H01H 13/183* (2013.01); *B60W 2050/0215* (2013.01); *B60W 2510/0638* (2013.01); *B60W 2540/06* (2013.01); *E05F 2015/483* (2015.01)

(58) Field of Classification Search
USPC ........... 70/237, 255, 256, 257, 258; 340/10.5, 340/3.1, 3.42, 3.43, 3.53, 438; 701/36, 49, 701/31.7, 31.8, 31.9, 31.6, 31.4, 29.7
See application file for complete search history.

(56) References Cited

U.S. PATENT DOCUMENTS

| | | | | |
|---|---|---|---|---|
| 5,486,817 A * | 1/1996 | Ina | ...................... | B60R 16/0315 307/10.1 |
| 5,614,769 A * | 3/1997 | Kuroda | ................... | E05B 77/48 292/DIG. 23 |
| 5,618,068 A * | 4/1997 | Mitsui | ..................... | E05B 81/20 292/201 |
| 6,125,583 A * | 10/2000 | Murray | ................... | E05B 81/20 49/291 |
| 6,321,488 B1 * | 11/2001 | Bigoszewski | ......... | E05F 15/638 49/139 |
| 7,127,848 B2 * | 10/2006 | Okada | ..................... | E05F 15/41 318/266 |

(Continued)

FOREIGN PATENT DOCUMENTS

DE   102010052582 A1   5/2012

*Primary Examiner* — Thomas Tarcza
*Assistant Examiner* — Richard Goldman
(74) *Attorney, Agent, or Firm* — Leydig, Voit & Mayer, Ltd.

(57) ABSTRACT

A method for monitoring a door contact switch of a driver's door of a motor vehicle locked in an idle state includes detecting an unlocking of the driver's door of the motor vehicle, and detecting whether a change in a door contact signal of the door contact switch takes place after the unlocking of the driver's door. If a change in the door contact signal has been detected, a plausibility counter is initialized, otherwise the method includes detecting whether a drive unit of the motor vehicle is activated. A "door contact implausible" state is established and the plausibility counter (P) is incremented if the activation of the drive unit has been detected in step d).

13 Claims, 5 Drawing Sheets

(56) References Cited

U.S. PATENT DOCUMENTS

| | | | | |
|---|---|---|---|---|
| 8,648,689 B2* | 2/2014 | Hathaway | ............... | B60K 28/12 292/216 |
| 2003/0067175 A1* | 4/2003 | Shiota | ............... | E05B 81/20 292/201 |
| 2003/0182863 A1* | 10/2003 | Mejean | ............... | E05B 81/70 49/26 |
| 2007/0016347 A1* | 1/2007 | Yoshida | ............... | G05B 19/0425 701/36 |
| 2007/0126561 A1* | 6/2007 | Breed | ............... | B60K 28/066 340/426.13 |
| 2007/0266635 A1* | 11/2007 | Sugiura | ............... | E05F 15/42 49/27 |
| 2011/0054735 A1* | 3/2011 | Kamiya | ............... | B60R 25/245 701/36 |
| 2012/0016550 A1* | 1/2012 | Oakley | ............... | E05B 81/54 701/31.7 |
| 2013/0207773 A1* | 8/2013 | Hathaway | ............... | B60K 28/12 340/3.43 |
| 2015/0210289 A1* | 7/2015 | Eichin | ............... | B60W 10/06 701/49 |
| 2015/0233145 A1* | 8/2015 | Kuriyama | ............... | E05B 41/00 292/201 |

* cited by examiner

METHOD FOR MONITORING A DOOR CONTACT SWITCH OF A DRIVER'S DOOR OF A MOTOR VEHICLE

CROSS REFERENCE TO RELATED APPLICATIONS

Priority is claimed to German Patent Application No. DE 102014100927.4, filed on Jan. 28, 2014, the entire disclosure of which is hereby incorporated by reference herein.

FIELD

The present invention relates to a method for monitoring a door contact switch of a driver's door of a motor vehicle.

BACKGROUND

Modern motor vehicles are frequently equipped with vehicle control systems. Examples that can be cited in this connection include start-stop systems, by means of which, for example, during a stop at traffic lights or in the case of a traffic jam, fuel can be saved by switching off a combustion engine of the motor vehicle. In the case of motor vehicles with manual transmission, the start-stop system switches off the combustion engine of the motor vehicle when the neutral gear is engaged, as long as the driver does not actuate the clutch pedal. When the clutch pedal is again actuated, the combustion engine is automatically restarted. In the case of motor vehicles which are equipped with automatic transmission and a start-stop system, the engine is switched off, for example, when the driver actuates the foot brake for a specific time period when the motor vehicle is stationary. Particularly in the case of motor vehicles which are equipped with start-stop systems of this type, it is important to recognize in a reliable manner that the driver has left the motor vehicle. Otherwise, the motor vehicle could be mistakenly restarted, even though the driver is no longer located in the vehicle passenger compartment.

"Adaptive Cruise Control" (ACC) systems can be cited as further vehicle control systems that are used in motor vehicles. In the case of these adaptive cruise control systems also, it is important to recognize in a reliable manner that the driver has left the motor vehicle.

The door contact switches of a driver's door of the motor vehicle are frequently used to detect whether the driver has left the motor vehicle. These door contact switches are normally disposed in a door lock and are designed in such a way that they are actuated by the opening or closing of the driver's door and thus generate door contact signals indicating whether the driver's door is opened or closed.

In order to be able to reliably recognize a door opening or door closure, two door contact switches that are independent from one another are normally provided, so that, if one of the two door contact switches fails, the other, still operational, door contact switch can provide a corresponding door contact signal and redundancy is thus provided. The disadvantage of using two redundant door contact switches is that additional component costs are thereby incurred.

A method is known from DE 10 2010 052 582 A1 for recognizing an opened door of a motor vehicle, said method working with only one door contact switch. In this method, a counter is set following an activation of an electrically driven door lock motor, said counter being able to monitor the time duration after the door lock motor has been activated. If no door contact signal of the door contact switch indicating that the door has been opened has been received within a predefined time duration, the "door contact fault" status is established and the basic state is again selected, in which monitoring is carried out in order to determine whether the door lock motor has been activated by a user.

If the motor vehicle has been started several times without corresponding door contact signals having previously been detected, it is assumed in this method that the door contact switch has a defect. For example, an error is detected if the driver enters the motor vehicle via the passenger door and starts the drive unit, since no door contact signal was detected before the drive unit was started.

SUMMARY

In an embodiment, the present invention provides a method for monitoring a door contact switch of a driver's door of a motor vehicle locked in an idle state including detecting an unlocking of the driver's door of the motor vehicle, and detecting whether a change in a door contact signal of the door contact switch takes place after the unlocking of the driver's door. If a change in the door contact signal has been detected, a plausibility counter is initialized, otherwise the method includes detecting whether a drive unit of the motor vehicle is activated. A "door contact implausible" state is established and the plausibility counter (P) is incremented if the activation of the drive unit has been detected in step d).

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

Further features and advantages of the present invention will become clear from the following description of preferred example embodiments, with reference to the attached drawings, in which.

DETAILED DESCRIPTION

Figure 1:
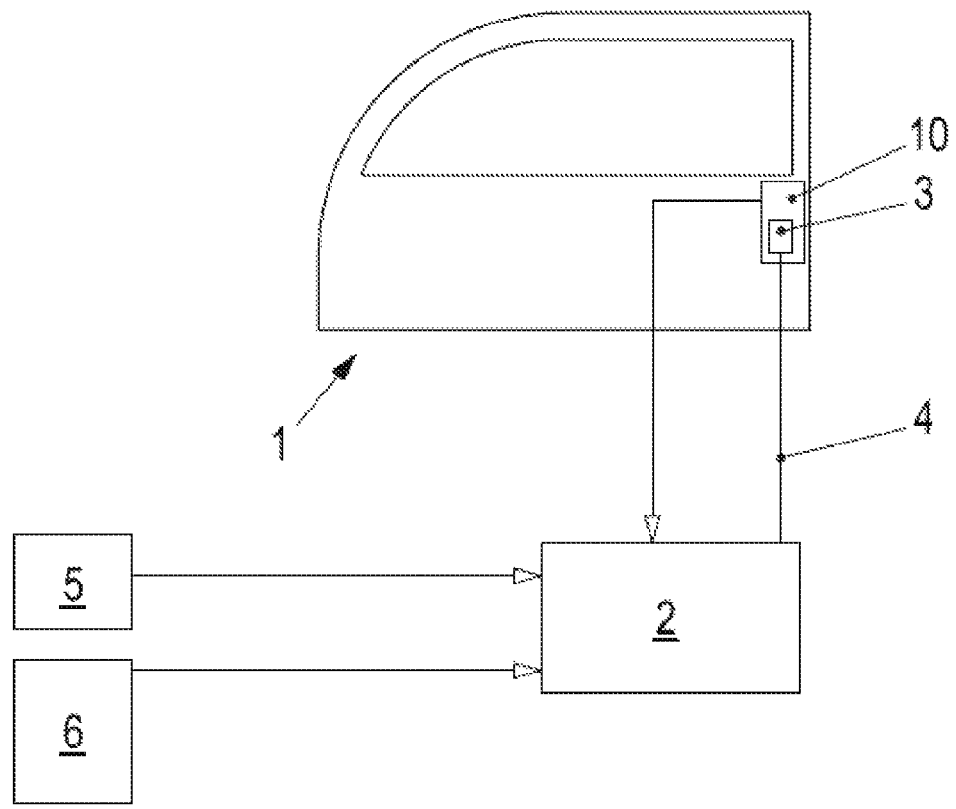
FIG. 1 shows a schematic representation of a driver's door of a motor vehicle and a control device to carry out a method for monitoring a door contact switch of the driver's door.

An aspect of the present invention provides an improved method for monitoring a door contact switch of a driver's door of a motor vehicle with only one door contact switch, and to reliably detect a possible defect in the door contact switch.

In an embodiment, the present invention provides a method for monitoring a door contact switch of a driver's door of a motor vehicle locked in an idle state comprises the following steps:

a) detecting an unlocking of the driver's door of the motor vehicle,
b) detecting whether a change in a door contact signal of the door contact switch takes place after the unlocking of the driver's door,
c) initializing a plausibility counter (P) if a change in the door contact signal has been detected, otherwise
d) detecting whether a drive unit of the motor vehicle is activated,
e) establishing a "door contact implausible" state and incrementing the plausibility counter (P) if the activation of the drive unit was detected in step d).

In an embodiment, the method allows—on the basis of a driver's door being locked in an idle state of the motor vehicle—an effective detection of whether the driver's door of the motor vehicle has been opened after the unlocking. Furthermore, a possible defect in the door contact switch can also be reliably determined. Namely, if the drive unit has been activated after the driver's door of the motor vehicle has been unlocked, the driver must have previously actuated the driver's door. If no corresponding change in the door contact signal has been detected, this indicates a defect in the door contact switch. The plausibility counter provided according to the invention forms a variable which, in particular, can be evaluated by the control device, for a possible defect in the door contact switch. If the change in the door contact signal has been correctly detected in a further performance of the method, the plausibility counter is reinitialized.

In practice, it frequently occurs that the driver's door of the motor vehicle is unlocked from outside without the driver's door then being opened. This is the case, for example, if only the tailgate has been opened after the unlocking in order to obtain access to a trunk of the motor vehicle. In order to take this circumstance into account and avoid possible errors in the recognition of the door contact signal, it is proposed in a preferred embodiment that a time-measuring device is activated after the detection of the unlocking of the driver's door, and a check is carried out to determine whether the change in the door contact signal takes place within a defined time period, wherein the method is continued with method step d) if the time period has not yet elapsed and no change in the door contact signal has been detected, and is continued with step a) if the time period has elapsed and no change in the door contact signal has been detected. The method can preferably be continued here with method step b) if no activation of the drive unit of the motor vehicle was detected in method step d).

In practice, it may furthermore arise that the driver's door of the motor vehicle is unlocked and relocked shortly afterwards because, for example, the unlocking was carried out mistakenly. In order to take this circumstance into account and avoid possible errors in the detection of the door contact signal, it is proposed in a particularly preferred embodiment that a check is carried out after the activation of the time-measuring device and before the performance of step b) to determine whether the driver's door of the motor vehicle has been relocked.

The present invention also provides a method for monitoring a door contact switch of a driver's door of a motor vehicle on the basis of an idle state in which a drive unit of the motor vehicle is deactivated and the driver's door is either unlocked or internally locked comprises the following steps:
a') detecting an activation of a drive unit of the motor vehicle,
b') continuing the method with method step a') if the drive unit of the motor vehicle has not been activated, otherwise
c') detecting whether a change in a door contact signal of a door contact switch (2) has taken place before the switch to the idle state,
d') initializing a plausibility counter (P) if a change in the door contact signal has been detected, otherwise
e') establishing a "door contact implausible" state and incrementing the plausibility counter (P).

In an embodiment, the method allows—on the basis of the driver's door being unlocked or internally locked in an idle state of the motor vehicle and a deactivated drive unit—a detection of whether the driver's door of the motor vehicle has been opened before the motor vehicle is started. Furthermore, a possible defect in the door contact switch can be reliably determined. If the drive unit has been started, but no change in the door contact signal has been detected before the switch to the idle state, the driver's door must have been actuated. If no corresponding change in the door contact signal has been detected, this indicates a defect in the door contact switch. Here also, the plausibility counter provided according to the invention forms a variable which, in particular, can be evaluated by the control device, for a possible defect in the door contact switch. If the change in the door contact signal has been correctly detected in a further performance of the method, the plausibility counter is reinitialized.

With methods according to embodiments of the invention the status of the drive unit can be considered and used for a plausibility check on the function of the door contact switch.

In a preferred embodiment, it can be provided that a standing time t_Stand of the motor vehicle is determined and a standing time factor for incrementing the plausibility counter is calculated therefrom. The standing time factor can be calculated, for example, by dividing the standing time (measured in minutes) by a factor of 10.

In a particularly preferred embodiment, it is proposed that a standing time limitation value ts_MAX is set and a check is carried out to determine whether the standing time t_Stand is greater than the standing time limitation value ts_MAX, wherein the standing time factor is calculated from the standing time t_Stand if t_Stand<ts_MAX, and otherwise the standing time factor is calculated from the standing time limitation value ts_MAX. An excessive incrementing of the plausibility counter by the standing time factor calculated in the manner described above can thereby be avoided in the case of long-standing times.

In an appropriate embodiment, the detection of the activation of the drive unit of the motor vehicle can be carried out by checking the operating status of an ignition device of a combustion engine of the drive unit of the motor vehicle and/or by checking whether a rotational speed of the combustion engine is greater than 0.

In a further advantageous embodiment, it is proposed that a check is carried out following the activation of the drive unit to determine whether a change in the door contact signal of the door contact switch takes place following a further deactivation of the drive unit, wherein the plausibility counter is incremented if no change in the door contact signal is detected and the drive unit has not been reactivated. Namely, in this case, in which the drive unit has been deactivated and not subsequently reactivated, it must be assumed that the driver has very probably left the motor vehicle and the opening of the driver's door has not been correctly detected.

A fault in the door contact switch occurs if the plausibility counter has exceeded a specific default threshold value. The generation of an error message, for example in the event of a one-off detection of an implausible door contact, is thereby prevented.

In another embodiment the present invention relates to a motor vehicle, comprising a door with a door contact switch for detecting an opened or closed state of the driver's door and a control device which is connected to the door contact switch. The control device may be configured to carry out methods as described above.

FIG. 1 shows a driver's door 1 of a motor vehicle and a control device 2 which is configured to carry out a method for monitoring a door contact switch 3 of a driver's door 1 of a motor vehicle according to a preferred example embodiment of the present invention. The driver's door 1 has a door contact switch 3 which is preferably integrated into a door lock 10 and is connected by means of a connection line 4 to the control device 2. The connection line 4 may, in particular, be a fieldbus line, preferably a CAN bus line. The locking or unlocking of the driver's door 1 can be carried out mechanically or optionally by means of an electric door lock motor which can preferably be integrated into the door lock 10 of the driver's door 1. In a known manner, the driver's door 1 equipped with the door contact switch 3 comprises, on an outside and on an inside, in each case (at least) one handling means not explicitly shown here, in particular a handling grip, so that the unlocked driver's door 1 can be opened or relocked from outside or inside.

The door contact switch 3 is designed so that it can detect whether the unlocked driver's door 1 of the motor vehicle has been opened or closed. Either a "DOOR_CLOSED" door contact signal, if the driver's door 1 has been locked, or a "DOOR_OPENED" door contact signal, if the driver's door 1 has been opened, is made available to the control device 2 via the connection line 4 for further processing. Changes in the door contact signal (i.e. from "DOOR_CLOSED" to "DOOR_OPENED" and vice versa) in particular are relevant for the further processing.

The control device 2 is designed so that it can receive and evaluate further vehicle state information and/or time information. Said information which can be evaluated by the control device 2 may include, for example:
date,
time,
status (on/off) of an ignition device 5 of a combustion engine 6 of the motor vehicle,
engine rotational speed (n) of the combustion engine 6,
status information indicating whether a locking of the driver's door 1 from outside (status signal: "EXT_LOCK") or from inside (status signal: "INT_LOCK") or an unlocking of the driver's door 1 has taken place.

From a change in the door contact signal from "DOOR_CLOSED" to "DOOR_OPENED" or from "DOOR_OPENED" to "DOOR_CLOSED" and from the further information additionally made available to the control device 2, it can, inter alia, be reliably recognized in the manner described below whether the driver's door 1 has been opened after it has been unlocked or whether the motor vehicle has been left after the combustion engine 6 has been switched off. It is furthermore possible to detect a possible defect in the door contact switch 3.

After an unlocking of the driver's door 1 of the motor vehicle, a check is carried out by the control device 2 to determine whether a change in the door contact signal of the driver's door 1 from "DOOR_CLOSED" to "DOOR_OPENED" has been made available by the door contact switch 3. If a change in the door contact signal could be detected, evidently no malfunction has occurred. If no change in the door contact signal has been detected, but the combustion engine 6 of the motor vehicle has been started, the driver's door 1 of the motor vehicle must have been opened at a time before the combustion engine 6 was started. It can be inferred from this situation that the door contact switch 3 is possibly defective. A plausibility counter P which is stored in the control device 2 is incremented.

Figure 2:
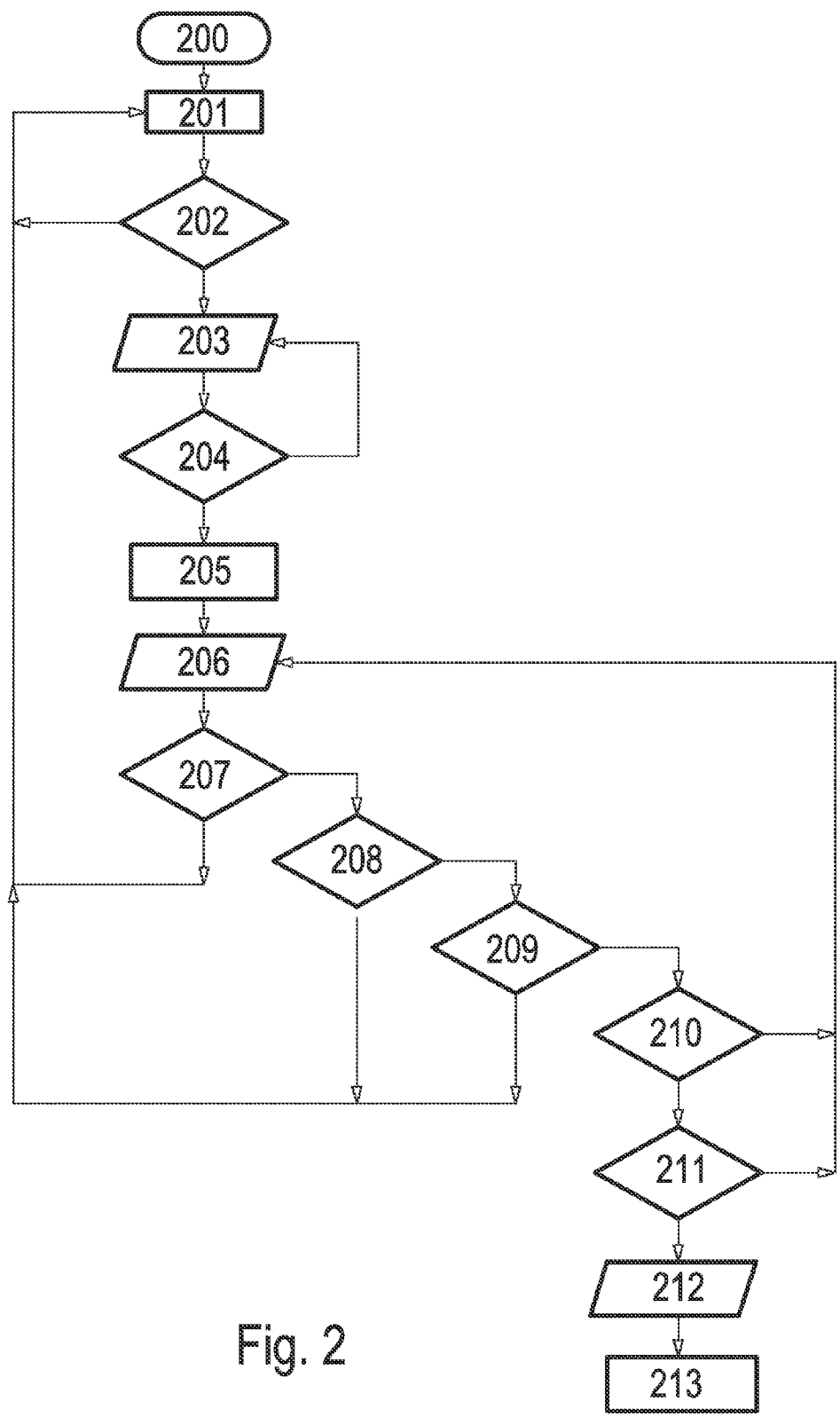
FIG. 2 shows a flow diagram illustrating the process of the method, on the basis of a driver's door of the motor vehicle locked in an idle state.

With reference to FIG. 2, a flow diagram illustrating in detail the aspect of the method described above will be explained in detail below. In an idle state (basic state), the driver's door 1 of the motor vehicle is locked. Following the program start 200, an initialization first takes place in a step 201. A check is then carried out in a step 202 to determine whether the driver's door 1 of the motor vehicle is either externally locked or is locked in a safety locking mode. In the case of the "simple" external locking, vehicle occupants still have the facility to unlock the driver's door 1 from inside. In the safety locking mode, the driver's door 1 can no longer be unlocked from inside. Passenger compartment monitoring means of an alarm device of the motor vehicle are also frequently activated in this safety locking mode.

If an external locking of the driver's door 1 cannot be detected in step 202 in the "simple" locking mode or in the safety locking mode, a return to the initialization step 201 takes place. If a locking of the driver's door 1 has been recognized, a corresponding state variable ("LOCKING" or "SAFETY LOCKING") is set in step 203 depending on the locking type, indicating that the motor vehicle is locked in one of the two aforementioned locking modes. In a next step 204, a check is carried out to determine whether the driver's door 1 of the motor vehicle has been externally unlocked. If not, the corresponding state variable ("LOCKING" or "SAFETY LOCKING") is again set in step 203 and the method is continued at this point with a further check to determine whether the driver's door 1 has been unlocked. If an external unlocking could be detected, a time-measuring device which is set to a specific time value t_Max (for example three minutes) is started in step 205. Furthermore, in step 206 a corresponding state variable ("UNLOCKING_EXTERNAL") is set which indicates that the driver's door 1 of the motor vehicle has been externally unlocked.

In a next step 207, a check is carried out to determine whether the driver's door 1 of the motor vehicle has possibly been externally relocked because, for example, the previous external unlocking was carried out mistakenly and this mistake has been recognized by the operating person. If so, a return to the initialization of the method (step 201) takes place. If not, it is determined, in a step 208, whether the door contact signal of the door contact switch 3 has changed (here from "DOOR_CLOSED" to "DOOR_OPENED"). As a result, a check is therefore carried out to determine whether the driver's door 1 of the motor vehicle has been opened after the external unlocking and the "DOOR_OPENED" door contact signal has been forwarded to the control device 2. If so, the door contact switch 3 is evidently operating correctly and a return to the initialization step 201 takes place. If not, a check is carried out in a step 209 to determine whether the time value t_Max of the time-measuring device has elapsed. If so, the driver's door 1 of the motor vehicle has been externally unlocked, but has very probably not been subsequently opened from outside. This situation can arise, for example, if the driver's door 1 has been mistakenly unlocked, but this mistake has not been recognized by the operating person. A return to the initialization step 201 again takes place. If the time value t_Max of the time-measuring device has not yet elapsed, the possibility exists with a certain probability that the driver has opened the driver's door 1 of the motor vehicle and is located in the vehicle passenger compartment, wherein the opening of the driver's door 1 has not been recognized. In a next step 210, the status of the ignition device 5 of the motor vehicle is therefore checked. If the ignition device 5 is not switched on, a return to step 206 takes place. The corresponding state variable ("UNLOCKING_EXTERNAL") is again set and the method is continued at this point in the flow diagram. If the ignition device 5 has been activated, a check is carried out in a next step 211 to determine whether the engine rotational speed n of the combustion engine 6 is greater than 0. If not, a return takes place to step 206, in which the corresponding ("UNLOCKING_EXTERNAL") state variable is set. The method is then resumed once more at this point in the flow diagram. If the rotational speed n>0, the combustion engine 6 of the motor vehicle has quite evidently been successfully started, even though an opening of the driver's door 1 of the motor vehicle could not be detected at any time by the door contact switch 3. Accordingly, in a step 212, a state variable ("door contact implausible") is set and the plausibility counter P is incremented accordingly in a step 213 by a parameter value PAR. For example, the parameter value can be set to a numerical value PAR=10.

Figure 3:
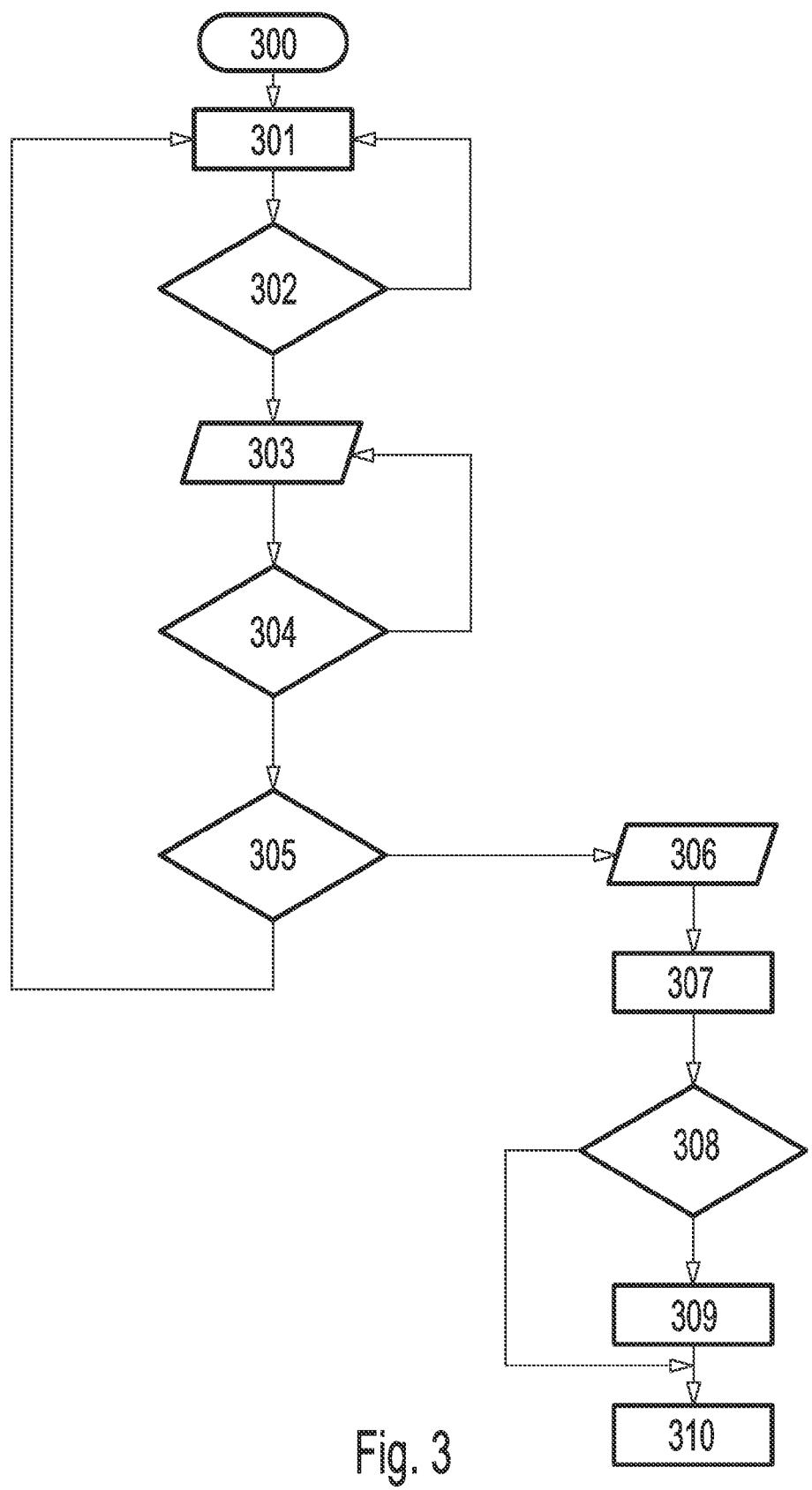
FIG. 3 shows a flow diagram illustrating the process of the method, on the basis of an idle state in which a drive unit of the motor vehicle is deactivated and the driver's door is either unlocked or internally locked.

With reference to FIG. 3, the situation of a longer standing time with an unlocked or internally locked driver's door 1 and a deactivated drive unit of the motor vehicle will be explained in detail below. The aim is to check whether the driver has left the motor vehicle after switching off the combustion engine 6. In contrast to FIG. 2, the driver's door 1 of the motor vehicle is therefore unlocked or internally locked in the idle state (basic state). Furthermore, the drive unit of the motor vehicle is deactivated. Following the program start in method step 300, an initialization first takes place in a step 301. In a next step 302, a check is carried out to determine whether the ignition device 5 of the combustion engine 6 of the motor vehicle has been activated. If not, a return to the initialization in step 301 takes place and the method is continued at this point with a further check to determine whether the ignition device 5 has been activated. If the ignition device 5 has been activated, a corresponding "IGNITION ON" state variable is set in step 303. In a next step 304, a check is then carried out to determine whether the engine rotational speed n of the combustion engine 6 is greater than 0. If not, a return to step 303 takes place and a check is again carried out in step 304 to determine whether the engine rotational speed n>0. If an engine rotational speed n>0 is detected, a check is carried out in step 305 to determine whether a change in the door contact signal of the door contact switch 3 has been detected before the idle state. If so, the operation of the door contact switch 3 is obviously not adversely affected and the leaving of the motor vehicle has been correctly recognized. A return to the initialization step 301 takes place. If not, a "door contact implausible" state variable is set in step 306, since no change in the door contact signal of the door contact switch 3 has been detected and a fault has evidently occurred.

A calculation of the standing time t_Stand of the motor vehicle is carried out in a next step 307. Date information as well as time information can optionally be used for this purpose. A standing time limitation value ts_MAX can preferably be stored in the control device 2. This standing time limitation value ts_MAX can be set, for example, to ts_MAX=100 minutes. A check is then carried out in the subsequent step 308 to determine whether the calculated standing time t_Stand is greater than ts_MAX. If not, the plausibility counter P is incremented by a standing time factor STAND in a step 310. One possibility for calculating the standing time factor STAND is: STAND=standing time (in minutes)/10. If the standing time t_Stand is greater than ts_MAX, the standing time t_Stand is limited to this value in step 309 and is used to calculate the standing time STAND in the manner described above. An excessive incrementing of the plausibility counter P is thereby avoided, particularly in the case of very long standing times, since the standing time t_Stand is limited to ts_MAX.

Figure 4:
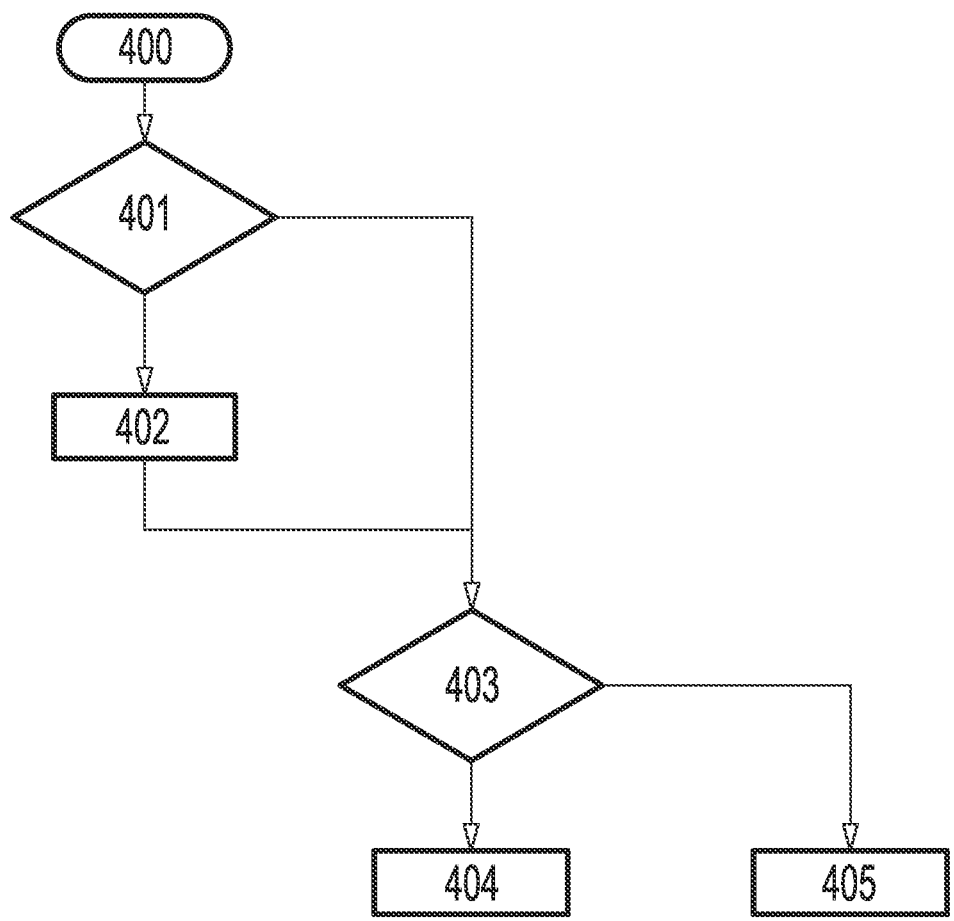
FIG. 4 shows a flow diagram illustrating an evaluation of a plausibility counter.

With reference to FIG. 4, the evaluation of the plausibility counter P, which can be carried out by means of the control device 2, will be explained in detail below. After the start 400, a check is carried out in a step 401 to determine whether the door contact switch 3 has provided a door contact signal which indicates a change of state of the driver's door 1 (i.e. a change in the door contact signal from "DOOR_CLOSED" to "DOOR_OPENED" or from "DOOR_OPENED" to "DOOR_CLOSED"). If so, the plausibility counter P is initialized in a step 402 and set to a value P=0. If not, a check is carried out in a step 403 to determine whether the plausibility counter P has exceeded a threshold value P_Threshold, so that P>P_Threshold applies. The threshold value P_Threshold can be set, for example, to P_Threshold=20. If the threshold value P_Threshold has been exceeded, the door contact signal is implausible and a fault in the door contact switch 3 has evidently occurred. The "door contact fault" state is set in step 404. If the threshold value P_Threshold has not been exceeded, the door contact signal is still plausible and the door contact switch 3 has no malfunction. The "door contact plausible" state is set in step 405.

Figure 5:
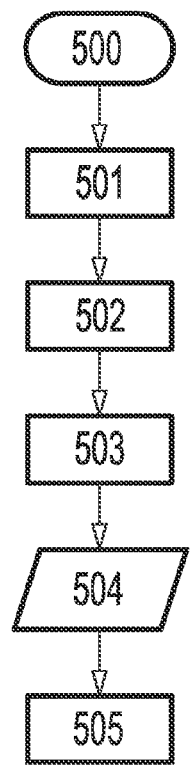
FIG. 5 to FIG. 8 show four possible operational processes of the method described here.
Figure 6:
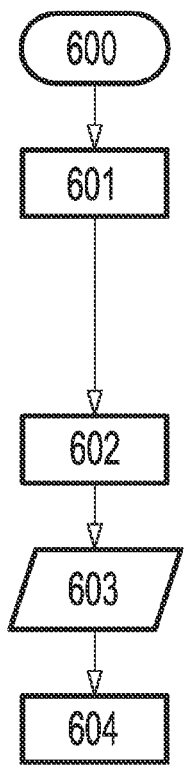
Figure 7:
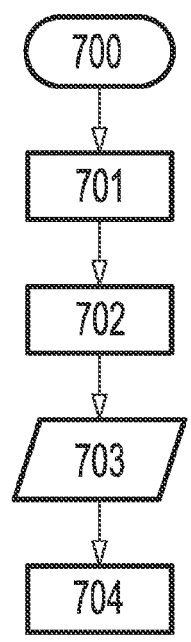
Figure 8:
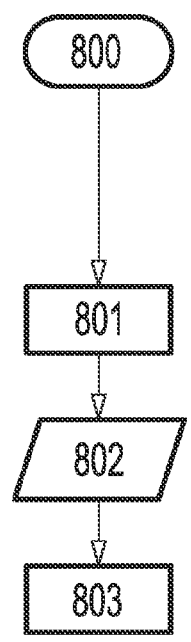

With reference to FIGS. 5 to 8, four possible operational processes will be explained in detail below. In FIGS. 5 and 6, the initial situation (idle state) is in each case a locked driver's door 1 of the motor vehicle in each case at the time of the start 500, 600. In FIGS. 7 and 8, the driver's door 1 is either unlocked or internally locked at the time of the start 700, 800 in the idle state. Furthermore, the drive unit of the motor vehicle is deactivated at the time of the start 700, 800.

With reference to FIG. 5, the driver's door 1 is unlocked in a step 501 and the unlocking of the driver's door 1 is detected by the control device 2. The driver's door 1 of the motor vehicle is then opened in a step 502, wherein a corresponding change in the door contact signal of the control device 2 is made available by the door contact switch 3. The combustion engine 6 of the motor vehicle is then started in a step 503 and a rotational speed n>0 is detected. Since the door opening was correctly detected before the combustion engine 6 started, no recognition according to the operational process presented in FIG. 2 takes place in step 504. Furthermore, the plausibility counter P is initialized in step 505 and set to a value P=0, since the function of the door contact switch 3 is evidently not impaired.

FIG. 6 shows the situation in which the combustion engine 6 of the motor vehicle has been activated (step 602), but the opening of the drivers' door 1 after the unlocking in the preceding step 601 has not been correctly detected by the door contact switch 3. A recognition according to the method presented in FIG. 2 takes place in step 603 and the plausibility counter P is incremented accordingly in step 604.

According to FIG. 7, the driver's door 1 of the motor vehicle is opened after the start (step 700) in step 701 and a change in the door contact signal is made available to the control device 2 by the door contact switch 3. The combustion engine 6 of the motor vehicle is then started in step 702 and a rotational speed n>0 of the combustion engine 6 is detected. Since the door opening was correctly detected before the combustion engine 6 started, no plausibility check according to the process presented in FIG. 3 takes place in step 703. The plausibility counter P is initialized in step 704 and set to a value P=0, since the function of the door contact switch 3 is not impaired.

FIG. 8 shows the situation in which, after the start (step 800) with an unlocked motor vehicle before the combustion engine 6 starts, no change in the door contact signal has been detected in step 801. A fault recognition according to the method presented in FIG. 3 then takes place in step 802 and the plausibility counter P is incremented in step 803 by the standing time factor STAND.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A method for monitoring a door contact switch of a driver's door of a motor vehicle in an idle state, the method comprising:
   detecting an unlocking of the driver's door of the motor vehicle using a control device,
   detecting whether a change in a door contact signal of the door contact switch takes place after the unlocking of the driver's door,
   initializing a counter (P) if a change in the door contact signal has been detected, otherwise
   detecting whether a drive unit of the motor vehicle is activated using the control device, and
   establishing a "door contact implausible" state associated with a corresponding suspected fault of the door contact switch and incrementing a variable of the counter (P) using the control device if the activation of the drive unit has been detected in step d); and
   evaluating, using the control device, the variable of the counter (P) so as to determine a defect in the door contact switch based on a magnitude of the variable.

2. The method as recited in claim 1, further comprising activating a time-measuring device after the detection of the unlocking of the driver's door, and carrying out a check to determine whether the change in the door contact signal takes place within a defined time period (t_Max), and one of:
   continuing the method with step d) if the time period (t_Max) has not yet elapsed and no change in the door contact signal has been detected, or continuing the method with step a) if the time period (t_Max) has elapsed and no change in the door contact signal has been detected.

3. The method as recited in claim 2, wherein the method is continued with method step b) if no activation of the drive unit of the motor vehicle was detected in method step d).

4. The method as recited in claim 2, further comprising carrying out a check after the activation of the time-measuring device and before the performance of step b) so as to determine whether the driver's door of the motor vehicle has been relocked.

5. The method as recited in claim 1, wherein the detecting the activation of the drive unit of the motor vehicle includes at least one of checking the status of an ignition device of a combustion engine of the drive unit of the motor vehicle or checking whether the combustion engine is rotating.

6. The method as recited in claim 1, further comprising carrying out a check following the activation of the drive unit to determine whether a change in the door contact signal of the door contact switch takes place following a further deactivation of the drive unit, and incrementing the counter (P) if no change in the door contact signal is detected and the drive unit has not been reactivated.

7. A motor vehicle, comprising a driver's door with a door contact switch for detecting an opened or closed state of the driver's door and the control device, where the control device is connected to the door contact switch, wherein the control device is configured to carry out the method recited in claim 1.

8. A method for monitoring a door contact switch of a driver's door of a motor vehicle based on an idle state in which a drive unit of the motor vehicle is deactivated and the driver's door is either unlocked or internally locked, the method comprising:
   detecting an activation of a drive unit of the motor vehicle using a control device,
   continuing the method with method step a) if the drive unit of the motor vehicle has not been activated, otherwise
   detecting whether a change in a door contact signal of a door contact switch has taken place before the switch to the idle state, and
   initializing a counter (P) if a change in the door contact signal has been detected, otherwise
   establishing a "door contact implausible" state associated with a corresponding suspected fault of the door contact switch and incrementing a variable of the counter (P) using the control device; and
   evaluating, using the control device, the variable of the counter (P) so as to determine a defect in the door contact switch based on a magnitude of the variable.

9. The method as recited in claim 8, further comprising determining a standing time (t_Stand) of the motor vehicle and calculating a standing time factor for incrementing the counter (P) from the standing time (t_Stand).

10. The method as recited in claim 9, further comprising setting a standing time limitation value (ts_MAX) and carrying out a check to determine whether the standing time (t_Stand) is greater than the standing time limitation value (ts_MAX), wherein the standing time factor is calculated from the standing time (t_Stand) if t_Stand<t_Stand_Max, and otherwise the standing time factor is calculated from the standing time limitation value (t_Stand_Max).

11. The method as recited in claim 8, wherein the detecting the activation of the drive unit of the motor vehicle includes at least one of checking the status of an ignition device of a combustion engine of the drive unit of the motor vehicle or checking whether the combustion engine is rotating.

12. The method as recited in claim 8, further comprising carrying out a check following the activation of the drive unit to determine whether a change in the door contact signal of the door contact switch takes place following a further deactivation of the drive unit, and incrementing the counter (P) if no change in the door contact signal is detected and the drive unit has not been reactivated.

13. A motor vehicle, comprising a driver's door with a door contact switch for detecting an opened or closed state of the driver's door and a control device which is connected to the door contact switch, wherein the control device is configured to carry out the method recited in claim 8.

* * * * *